(12) United States Patent
Kubo et al.

(10) Patent No.: US 6,452,286 B1
(45) Date of Patent: Sep. 17, 2002

(54) CONTROL DEVICE OF A HYBRID VEHICLE

(75) Inventors: Asami Kubo; Hideyuki Tamura; Mikio Matsumoto, all of Yokohama; Kenichi Goto, Yamato, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 11 days.

(21) Appl. No.: 09/652,261

(22) Filed: Aug. 30, 2000

(30) Foreign Application Priority Data

Sep. 2, 1999 (JP) ............................................ 11-248389

(51) Int. Cl.$^7$ ................................................. H02P 9/04
(52) U.S. Cl. ........................ 290/40 C; 701/36; 180/65.2
(58) Field of Search ................................ 290/40 C, 31, 290/19; 318/139, 140; 322/16, 13; 701/36; 180/65.2, 65.3, 65.4, 65.8

(56) References Cited

U.S. PATENT DOCUMENTS

| | | | | |
|---|---|---|---|---|
| 5,156,932 A | * | 10/1992 | Dougherty et al. | 29/623.2 |
| 5,166,584 A | | 11/1992 | Fukino et al. | 318/139 |
| 5,416,702 A | * | 5/1995 | Kitagawa et al. | 180/65.3 |
| 5,602,459 A | * | 2/1997 | Rogers | 320/134 |
| 5,637,987 A | * | 6/1997 | Fattic et al. | 180/65.3 |
| 5,783,872 A | * | 7/1998 | Blair | 307/46 |
| 5,806,617 A | * | 9/1998 | Yamaguchi | 180/65.2 |
| 5,883,496 A | * | 3/1999 | Esaki et al. | 318/139 |
| 5,925,938 A | * | 7/1999 | Tamor | 290/31 |
| 5,986,416 A | * | 11/1999 | Dubois | 318/113 |
| 5,998,884 A | * | 12/1999 | Kitamine et al. | 180/65.8 |
| 6,020,697 A | * | 2/2000 | Shimasaki et al. | 180/65.3 |
| 6,316,842 B1 | * | 11/2001 | Kuroda et al. | 180/65.4 |

FOREIGN PATENT DOCUMENTS

| | | |
|---|---|---|
| EP | 0 933 245 | 8/1999 |
| GB | 2 319 407 | 5/1998 |
| JP | 10-304511 | 11/1998 |
| WO | WO 96/22625 | 7/1996 |

OTHER PUBLICATIONS

Patent Abstracts of Japan, vol. 1999, No. 11, Sep. 30, 1999 & JP 11–164494, Jun. 18, 1999; Matsumae Hiroshi, "Hybrid Electric Vehicle".
Patent Abstracts of Japan, vol. 1999, No. 10, Aug. 31, 1999 & JP 11–136808; May 21, 1999, Kaneko Yutaro, Power Generation Controller for Hybrid Vehicle.

* cited by examiner

Primary Examiner—Joseph Waks
(74) Attorney, Agent, or Firm—Foley & Lardner

(57) ABSTRACT

When a vehicle is decelerating a controller of a motor-generator (2) computes a target charging current according to a charge state of a high voltage battery by a target charging current computing unit (23), and limits this current by a first limiter (24) having a limiter value. An electrical load current supplied to vehicle-mounted electrical loads is computed by an electrical load current detecting unit (27). A target generation current produced by the motor-generator (2) is computed by adding the target charging current and electrical load current, by a target generation current detecting unit (28, 30). This computed value is limited by a second limiter (31) having a limiter value which varies according to an engine rotation speed, ON/OFF state of an air-conditioner and speed ratio. When the vehicle is decelerating the motor-generator (2) is made to function as a generator driven by recovery energy, the high voltage battery and a low voltage battery for the vehicle-mounted electrical loads are charged without overcharging and excessive vehicle deceleration is prevented.

10 Claims, 6 Drawing Sheets

CONTROL DEVICE OF A HYBRID VEHICLE

FIELD OF THE INVENTION

This invention relates to a control device of a hybrid vehicle which comprises an internal combustion engine as a source of power for running a vehicle and an electric motor having a high voltage battery as a power supply, the electric motor being used as a generator when the vehicle is decelerating and charged by the high voltage battery and a low voltage battery for vehicle-mounted electrical loads.

BACKGROUND OF THE INVENTION

Recently, a hybrid vehicle has been developed comprising an internal combustion engine (gasoline engine) as a source of motive power for running a vehicle, and an electric motor having a high voltage battery as a power supply, as disclosed in Japanese patent publication Tokkai Hei 10-304511.

In this hybrid vehicle, the electric motor is used as a generator when the vehicle is decelerating (coasting) as a way of recovering the vehicle's inertia energy while it is decelerating, and the power so generated is used to) charge the high voltage battery and low voltage battery for supplying vehicle-mounted electrical loads.

SUMMARY OF THE INVENTION

Control of the current when power is being generated by the electrical motor is based on the charge state of the high voltage battery, and the current supplied to electrical loads (vehicle-mounted electrical loads) such as auxiliary devices mounted on the vehicle. Specifically, a target charge current supplied to) the high voltage battery according to the charge state of the high voltage battery is computed, an electrical load current supplied to the vehicle-mounted electrical loads is detected, and the electric motor is controlled so that the sum of these values coincides with the current generated by the electrical motor.

During deceleration, if the generated current is too large when energy recovery is being performed, the high voltage battery will be overcharged. This leads to) early deterioration of the battery and excessive vehicle deceleration due to increase of the load on the electric motor; and consequently, the driver will experience an uncomfortable deceleration feeling.

If the high voltage battery is a lead-acid battery, which is used for its low cost in comparison to expensive lithium ion batteries or nickel-hydrogen batteries, it easily degenerates due to overcharging and it is especial necessary to prevent overcharging.

It is therefore an object of this invention to prevent overcharging of the battery, prevent deterioration of the battery due to overcharge% and to prevent the deceleration from becoming too large during energy recovery when the vehicle is decelerating It is a further object of this invention to increase the enter recovery efficiency when the vehicle is decelerating. In order to achieve the above objects the invention provides a control device of a hybrid vehicle which provides an internal combustion engine as a power source for running a vehicle together with an electric motor. The control device comprises a high voltage battery which functions as a power source for the electric motor, a low voltage battery for vehicle-mounted electrical loads, a sensor for detecting a vehicle running state, and a microprocessor which controls the electric motor is programmed to determine a deceleration state of the vehicle, to cause the electric motor to function as a generator in the deceleration state, to perform control to charge the high voltage battery and low voltage battery by the current generated by the electric motor, and to limit the current generated by the electric motor by a limiter, and vary the value of this limiter according to the running state.

The details as well as other features and advantages of the invention are set forth in the remainder of the specification and are shown in the accompanying drawings.

DETAILED DESCRIPTION OF THE PREFERRED EMBODIMENTS

Figure 1:
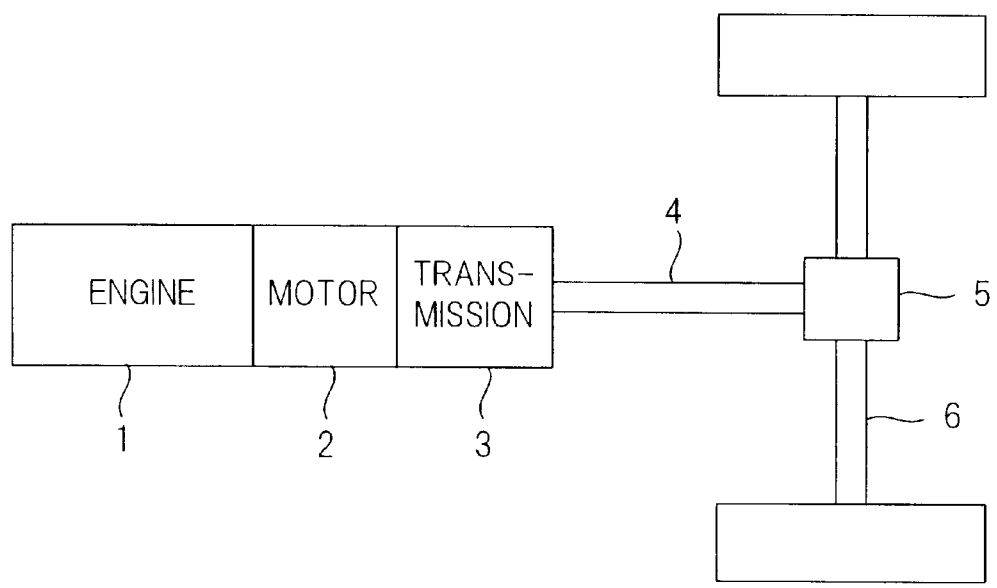
FIG. 1 is a system diagram of a hybrid vehicle showing one embodiment of this invention.

FIG. 1 is a system diagram of a hybrid vehicle showing one embodiment of this invention.

An electric motor which also functions as a generator (referred to hereafter as motor-generator 2 is connected to the output side of an internal combustion engine (referred to hereafter as engine) 1, and a transmission 3 is connected to this motor-generator 2. A vehicle shaft 6 on the driving wheel side is driven by a drive shaft 4 on the output side of the transmission 3 via a differential gear 5.

The motor-generator 2 is used to perform cranking of the engine 1 when the engine is started. If the vehicle is provided with an idle stop function which can stop the engine 1 automatically, such as when the vehicle is brought to a temporary halt, the motor-generator 2 starts the engine 1 automatically each time the conditions are satisfied for releasing idle stop once the idle stop function has been invoked.

When the torque of the motor-generator 2 is added to the torque of the engine 1 such as when the vehicle is accelerating the vehicle runs on high power. On the other hand, when the vehicle is decelerating, the motor-generator 2 generates electric power as a generator to recover the energy of inertia of the vehicle while it is running, charges the battery, and supplies current to other electric loads.

Figure 2:
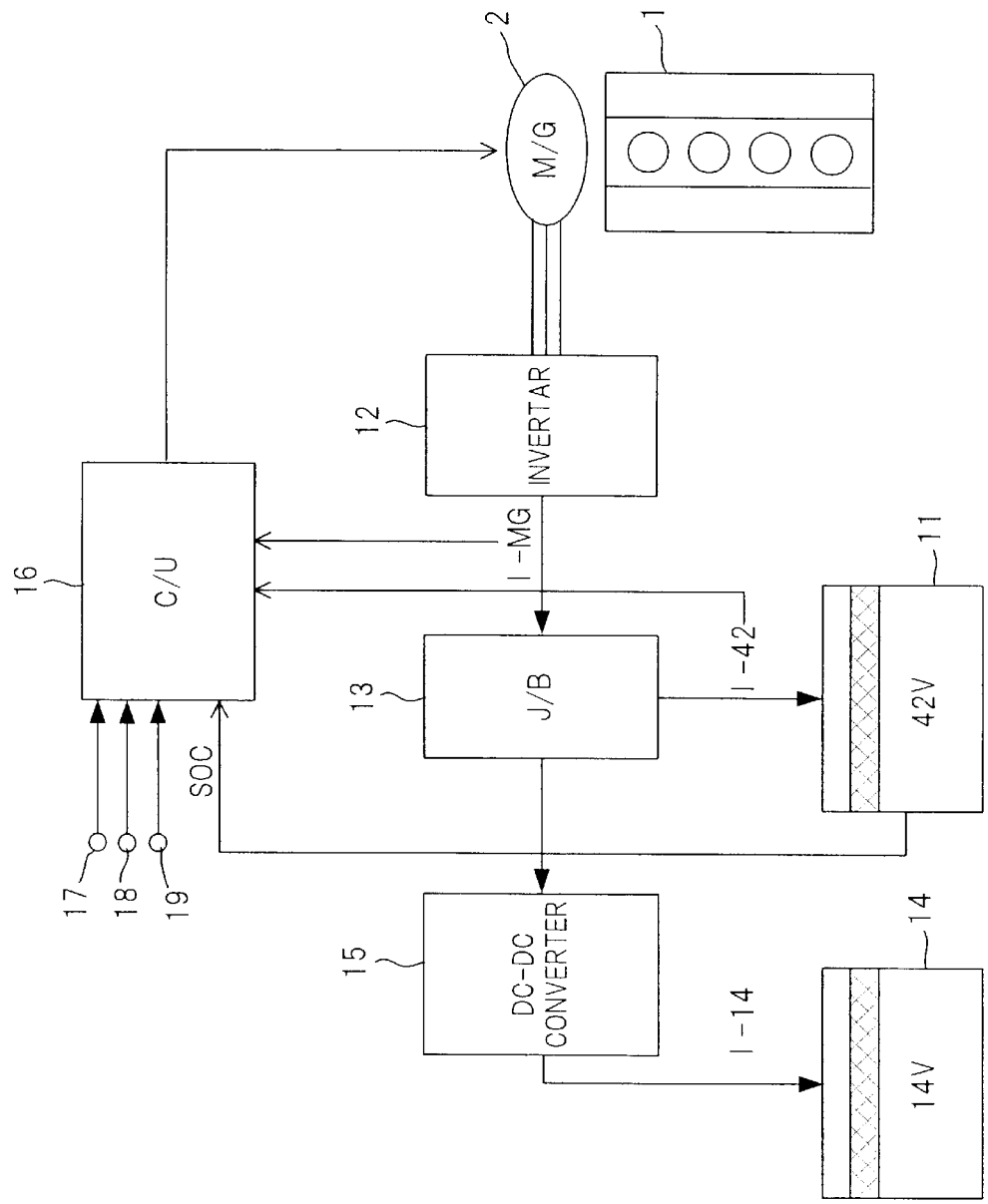
FIG. 2 is a system diagram of a power supply system in the hybrid vehicle.

FIG. 2 is a system diagram of the power supply system in this hybrid vehicle.

A high voltage battery 11 is a power supply which can be charged and discharged having a rated vole of approximately 42V, and which functions as the power supply for the motor-generator 2. Specifically, it is a lead-acid battery (a lead storage battery having an electrode of a lead grid comprising lead oxide whereof the composition changes during charging and discharging, and an electrolyte of dilute sulfuric acid).

When the motor-generator 2 is functioning as a generator to generate electricity, triphase alternating current generated by the motor-generator 2 is converted to direct current by an inverter 12, and is supplied to the high voltage battery 11 via a junction box 13.

Conversely, when the motor-generator 2 is functioning as a motor and discharging, power from the high voltage battery 11 is converted to triphase alternating current via the junction box 13 and inverter 12, and supplied to the motor-generator 2.

A low voltage battery 14 is a lead-add battery of rated voltage approximately 14V which is generally used as a power supply for vehicle-mounted electrical loads including an engine auxiliary load, and it stores part of the power generated by the motor-generator 2 via a DC/DC converter 15 after passing through the inverter 12 and junction box 13.

16 is a control unit which controls the operation of the motor-generator 2.

The control unit 16 receives input of various running conditions including an engine rotation speed Ne from a rotation speed sensor 17, a speed ratio of the transmission from a speed ratio sensor 18 and ON/OFF of an air conditioner from a air conditioner sensor 19, as well as detection values such as an SOC (State of Charge) which is the actual charging amount of the high voltage battery 11, a generation current I-MG generated by the motor-generator 2 and converted by the inverter 12, and a charging current I-42 to the high voltage battery 11, and controls the motor-generator 2 based thereon.

Figure 3:
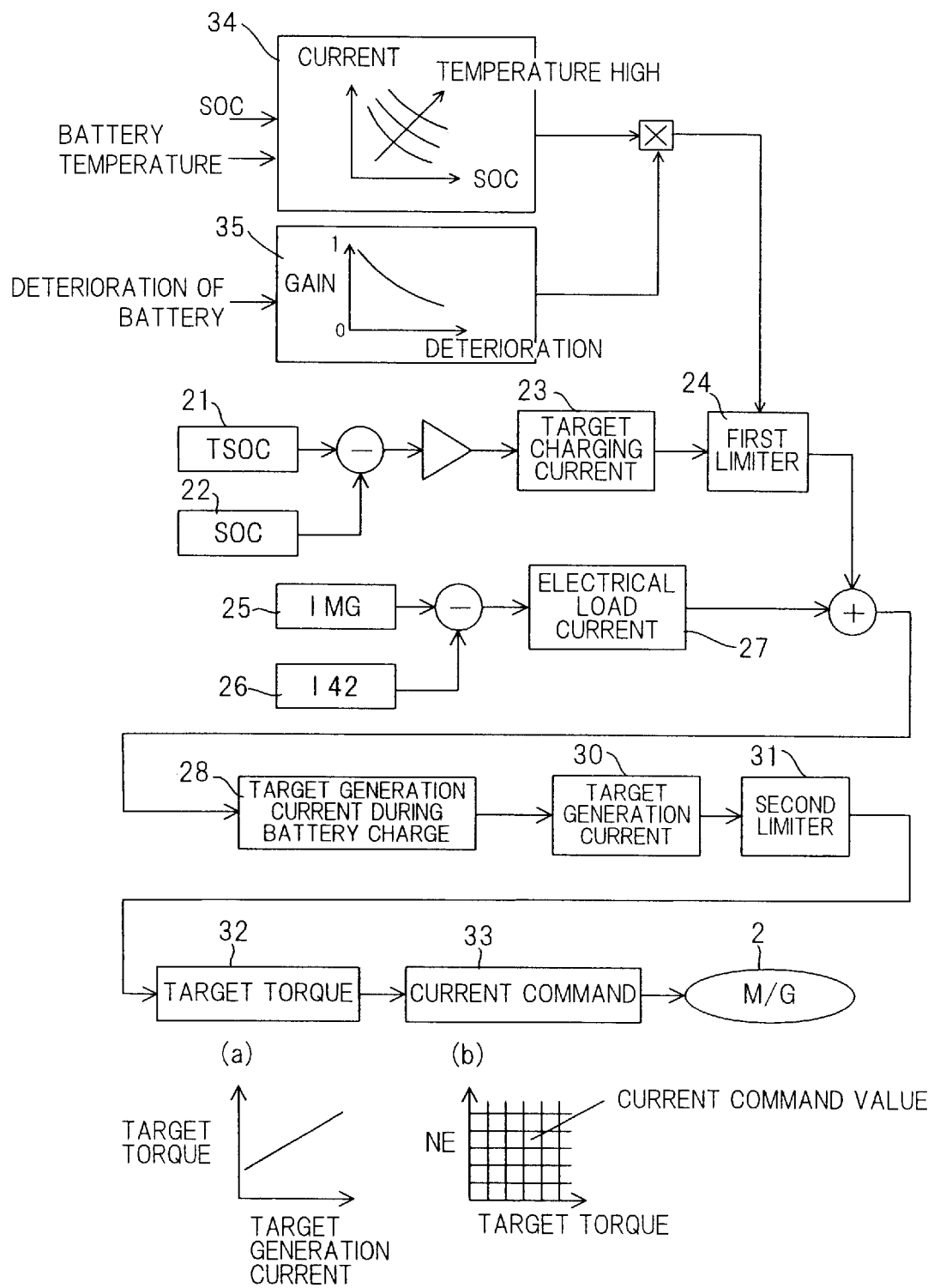
FIG. 3 is a control block diagram of generation current control of a motor-generator.

FIG. 3 is a control block diagram showing the charging current control of the motor-generator 2 by the control unit 16. This control unit comprises a microprocessor.

A target charging amount setting unit 21 sets a target charging amount TSOC of the high voltage battery 11. Herein, the target charging amount TSOC is set to, for example, 90°% of the charging amount when the battery is fully charged.

A charging amount detecting unit 22 detects the actual charging amount SOC of the high voltage battery 11. Specifically, the current during charging and discharging of the high voltage battery 11 detected by a current sensor is integrated over time, the internal resistance is computed from sample values of current and voltage during discharging, and calculated based on internal resistance estimation values corrected according to various environmental factors. The charging amount SOC may be calculated as a percentage (C) relative to the fully charged state, or calculated as an absolute amount (A.Hr).

A target charging current computing unit 23 compares the target charging amount TSOC with the actual charging amount SOC, multiplies by a gain based on proportional integral control computes a feedback control amount of the charging amount, converts this to a current, and thereby computes a target charging current to the high voltage battery 11. A charging current table based on the SOC can also be provided.

The voltage of the high voltage battery 11 may also be feedback controlled to a target voltage. Specifically, the target voltage of the high voltage battery 11 (e.g., 44V is set, the actual voltage is detected, a voltage feedback control amount is computed based on a comparison of the target voltage with the actual voltage, this is converted to a current, and the target charging Bent to the high voltage battery 11 is then computed. The target charging current computed from battery demand may also be corrected according to the motor efficiency, engine state or vehicle demand. In this case, the correction gain is large when the motor efficiency is good, and the correction gain is Large even when the engine fuel consumption is low. The correction gain is also large when, for example, the vehicle is required to climb a hill due to navigational information.

A first limiter 24 compares the target charging current computed by the target charging current computing unit 23 with a limiter value, and when the target charging current is equal to or grater than the limiter value, the target charging current is limited to the limiter value. This limiter value is specifically computed by multiplying a limiter basic value computed from the SOC and battery temperature by a limiter value basic value computing unit 34, by a limiter correction gain computed from the battery deterioration degree by a limiter correction gain computing unit 35.

Figure 4:
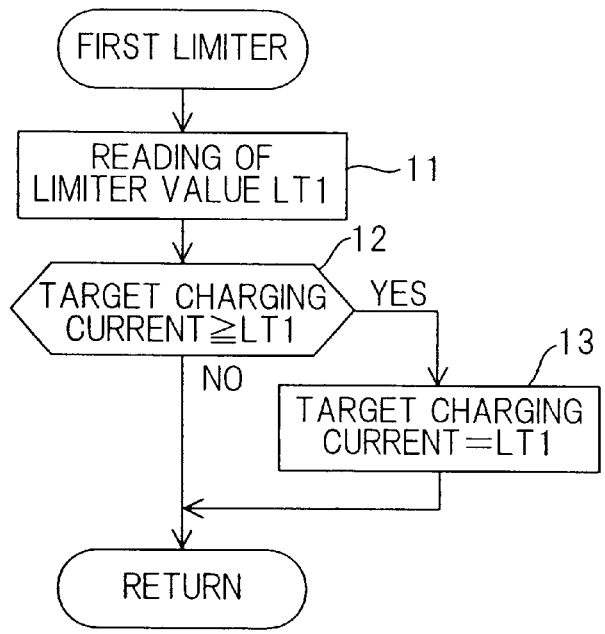
FIG. 4 is a flowchart of a control operation performed by a first limiter.

The limitation of the target charging current by the first limiter is specifically performed as shown by the flowchart of FIG. 4.

In a step S11, a limiter value LT1 is read, and in a step S12, it is determined whether or not the target charging current ≧LT1. When the target charging current ≧LT1, the target charging current is changed to LT1 in a step S13. Here, the limiter value LT1 is a permitted value showing by how much the high voltage battery can be charged to prevent overcharging of the high voltage battery.

In FIG. 3, a charging current detecting unit 25 detects the actual charging current I-MG of the motor-generator 2 by a current sensor. A charging current detecting unit 26 also detects the actual charging current I-42 to the high voltage battery 11 by a current sensor.

An electrical ad current detecting unit (estimating unit) 27 subtracts the charging current I42 to the high voltage battery 11 from the generation current I-MG of the motor-generator 2, and thereby computes an electrical load current (I-14)=(I-MG)–(I-42) supplied to vehicle-mounted electrical loads. Specifically, the charging current to the high voltage battery 11 is subtracted from the generation current of the motor-generator 2, the charging current to the low voltage battery 14 is calculated, and the charging current to this low voltage battery 14 is taken as the electrical load current.

A target ration current computing unit 28 for computing the target generation current when the battery is charging, is computed by the aforesaid target charging current computing unit 23, the electrical load current calculated by the aforesaid electrical load current detecting unit (estimating unit) 27 is added to the target charging current which has passed through the first limiter 24, and the target generation current of the motor-generator 2 (=target charging current+ electrical load current is computed.

When the SOC has reached the target SOC, the motor torque command is set to 0, and charging is not performed until the SOC decreases to a predetermined value due to electrical load consumption.

A second limiter 31 compares the target generation current determined by the target generation current determining unit 30 with a preset limiter value depending on running conditions, and when the target generation current is equal to or greater than the limiter value, the target generation current is limited to the limiter value.

Figure 5:
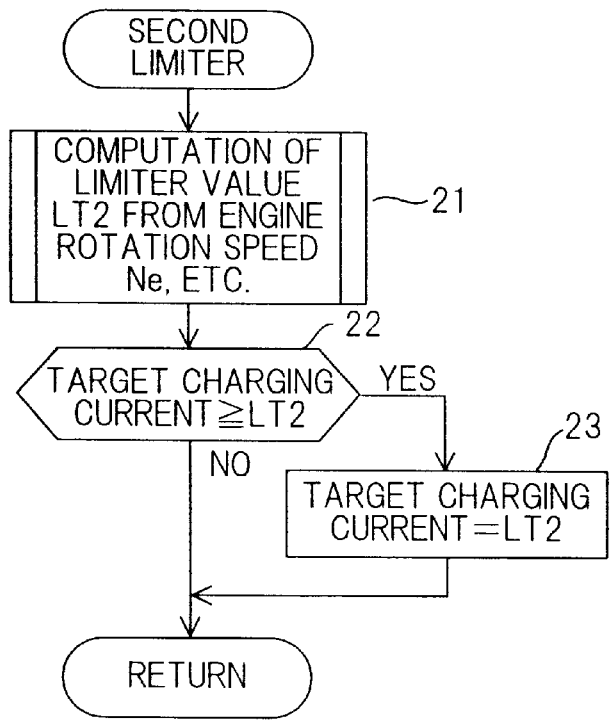
FIG. 5 is a flowchart showing a control operation performed by a second limiter.

The limitation of the target generation current by the second limiter is specifically performed as shown by the flowchart of FIG. 5.

In a step S21, a limiter value LT2 is computed based for example on the engine rotation speed Ne, and in a step S22, it is determined whether are not the target generation current ≧LT2. When the target generation current ≧LT2, the routine proceeds to a step S23, and the target generation current is set equal to LT2.

Figure 6:
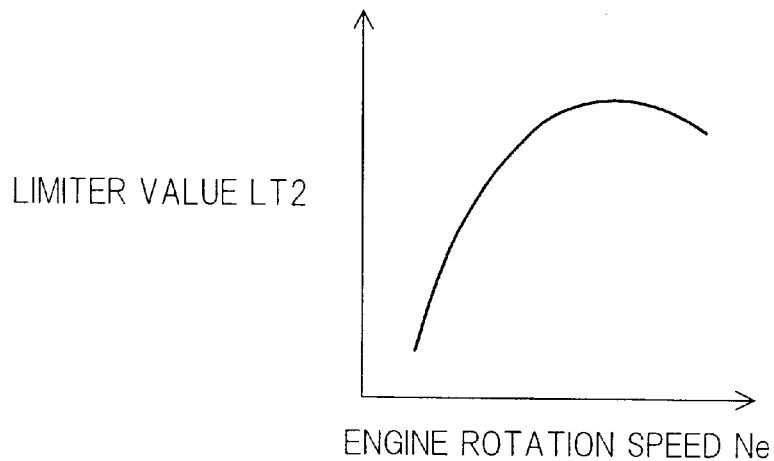
FIG. 6 is a diagram showing a typical setting (1) of a limiter value of the second limiter.

Here, the limiter value LT2 is set according to the engine rotation speed Ne so that it is smaller at low rotation speeds and larger at high rotation speeds as shown in FIG. 6.

When the vehicle deceleration characteristics are constant, as the inertia energy which can be absorbed during deceleration is high at high engine rotation speeds and low at low engine rotation speeds, a torque equivalent amount which can be absorbed by the motor-generator 2 at the present engine rotation speed Ne is taken as the limiter value of the motor generation current Regarding the limiter value LT2 of the second limiter, the following variation may also be used.

Figure 7:
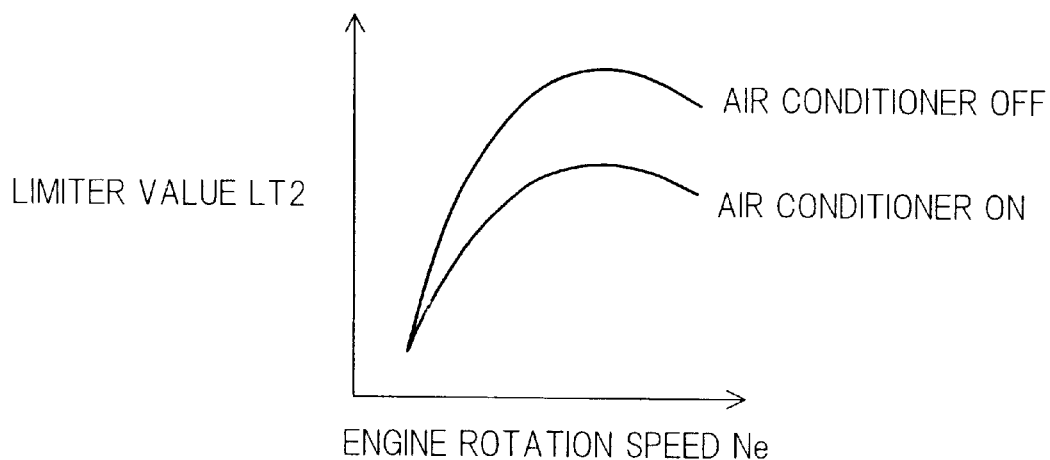
FIG. 7 is a diagram showing a typical setting (2) of a limiter value of the second limiter.

In this variation, the limiter value LT2 is set according to the engine rotation speed Ne so that it is small at low rotation speeds and large at high rotation speeds, as shown in FIG. 7. Tis is corrected according to the ON/OF° F. state of the air-conditioner which represents vehicle-mounted electrical loads so that it is relatively large when the air-conditioner is OFF and relatively small when the air-conditioned is ON, i.e., two limiter values are taken.

This is because the deceleration is smaller when the air-conditioner is OFF than when it is ON, and is intended to increase the energy recovery amount when the air-conditioned is OFF for the same deceleration.

Instead of correcting according to the ON/OFF state of the air-conditioner, the correction may be applied according to the ON/OFF state of vehicle-mounted electrical loads other than the air-conditioner (e.g., the power steering or lights, etc.).

Figure 8:
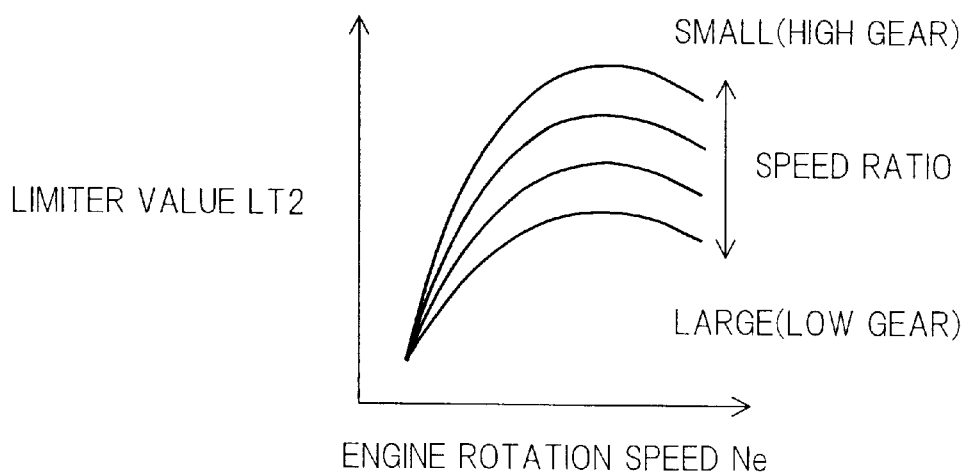
FIG. 8 is a diagram showing a typical setting (3) of a limiter value of the second limiter.

In FIG. 8, the aforesaid limiter value LT2 is set according to the engine rotation speed Ne to small at low rotation speeds and large at high rotation speeds, this value being further corrected according to the speed ratio of the transmission. The limiter value is set to be relatively large when the speed ratio is small gear),and set to be relatively small when the speed ratio is large Vow gear). This is to increase the energy recovery amount at low speed ratios (high gear). The deceleration is small when the speed ratio is small, and hence the deceleration is prevented from becoming excessive even if the deceleration energy recovery amount is increased.

Figure 9:
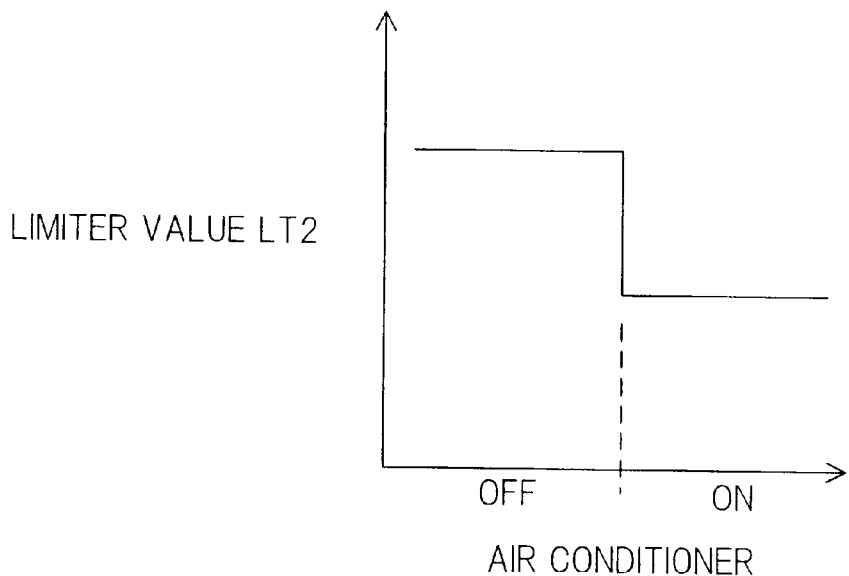
FIG. 9 is a diagram showing a typical setting (4) of a limiter value of the second limiter.

On the other hand, FIG. 9 shows the relation of the limiter value LT2 according to the ON/OFF state of the air-conditioner Bless of the engine rotation speed, the value being set large when the air conditioner is OFF and set small when the air-condition is ON. The limiter value may also be set according to the ON/OFF state of vehicle-mounted electrical loads other than the air-conditioned (e.g., the power steering or lights), as described above.

Figure 10:
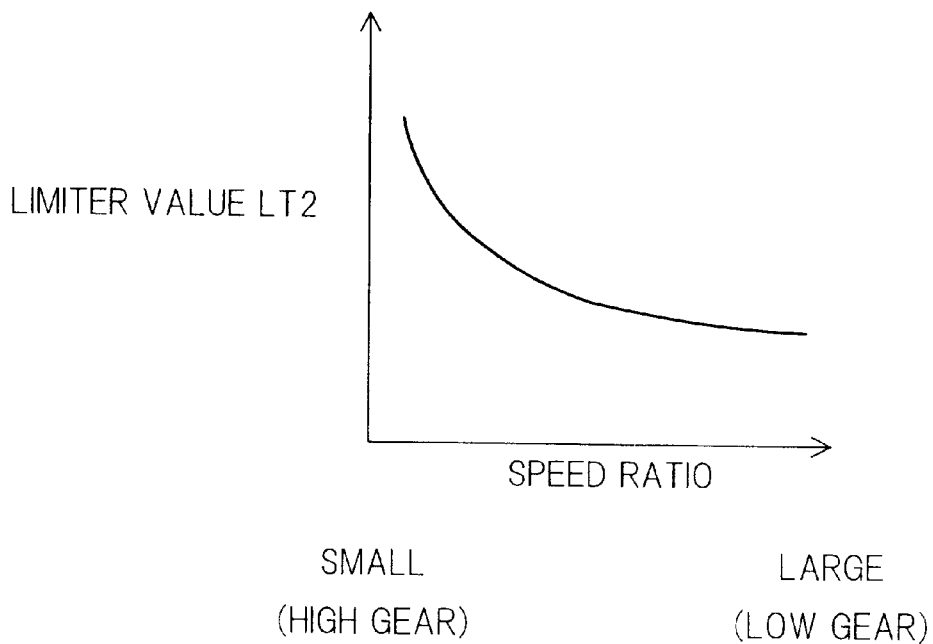
FIG. 10 is a diagram showing a typical setting (5) of a limiter value of the second limiter.

Further, as shown in FIG. 10, the limiter value LT2 may also be set depending only on the speed ratio regardless of the engine rotation speed, i.e., it may be set to be larger at low rotation speeds (high gear) and smaller at high rotation speeds Row gear).

In FIG. 3, a target torque computing unit 32 converts the target generation. current determined by the aforesaid target generation current determining unit 30 and limited as necessary by the second limiter 31, to a target torque of the motor-generator 2 by looking up a table in FIG. 3(a).

A motor-generator control unit (current command unit) 33 determines a current command value supplied to the motor-generator 2 necessary to obtain the target torque by looking up a map in FIG. 3(b) based on this target torque and the engine rotation speed Ne, and thereby controls the generation current of the motor-generator 2.

Due to the above control, using a lead-acid battery as the high voltage battery 11, deterioration of the battery due to overcharging is prevented by charging only to a permitted amount, the deceleration is prevented from becoming too large, and energy recovery during deceleration can be performed efficiently.

The entire contents of Japanese Patent Application P11-248389 (filed Sep. 2, 1999) is incorporated herein by reference Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. A control device of a hybrid vehicle, the vehicle comprising an internal combustion engine as a power source for running the vehicle together with an electric motor, a high voltage battery which supplies electric current for driving the electric motor, and a low voltage battery which supplies electric current for a vehicle-mounted electrical load, the control device comprising:

a sensor for detecting a vehicle running state, and a microprocessor programmed to:

determine a deceleration state of the vehicle, cause the electric motor to function as a generator in the deceleration state, perform control to charge the high voltage battery and low voltage battery by the current generated by the electric motor, limit the current generated by the electric motor by a limiter, cause the electric motor to generate a limited current, and vary the limited current according to the running state.

2. The control device as defined in claim 1, wherein the vehicle running state detecting sensor comprises a sensor which detects an ON/OFF state of the vehicle-mounted electrical load, and the microprocessor is further programmed to vary the limited current according to the ON/OFF state of the vehicle-mounted electrical load.

3. The control device as defined in claim 1, wherein the vehicle is provided with a transmission, the vehicle running state detecting sensor comprises a sensor which detects a speed ratio of the transmission, and the microprocessor is further programmed to vary the limited current according to the speed ratio of the transmission.

4. The control device as defined in claim 1, wherein the vehicle running state detecting sensor comprises a sensor which detects a rotation speed of the engine and the microprocessor is further programmed to vary the limited current according to the engine rotation speed.

5. The control device as defined in claim 4, wherein the vehicle running state detecting sensor further comprises a sensor which detects an ON/OFF state of the vehicle-mounted electrical load, and the microprocessor is further programmed to vary the limited current according to the ON/OFF state of the vehicle-mounted electrical load.

6. The control device as defined in claim 4, wherein the vehicle is provided with a transmission, the vehicle running state detecting sensor comprises a sensor which detects a speed ratio of the transmission, and the microprocessor is further programmed to vary the limited current according to the speed ratio of the transmission.

7. The control device as defined in claim 1, wherein the high voltage battery comprises a lead-acid battery.

8. A control device of a hybrid vehicle, the vehicle comprising an internal combustion engine as a power source for running the vehicle together with an electric motor, a high voltage battery which supplies electric current for driving the electric motor, and a low voltage battery which supplies electric current for a vehicle-mounted electrical load, the control device comprising:

a sensor which detects a state of charge of the high voltage battery, and a microprocessor programmed to:
compute a target charging current to charge the high voltage battery according to the state of charge of the high voltage battery,
compute an electrical load current supplied to the vehicle-mounted electrical load,
compute a target generation current generated by the electric motor by adding the target charging current and the electrical load current,
limit the target generation current by a limiter, and
limit the target generation current by another limiter.

9. The control device as defined in claim 8, wherein the control device further comprises a sensor which detects a battery temperature and a sensor with detects a battery deterioration degree, and the microprocessor is further programmed to set a limiter value due to the other limiter according to the battery state of charge, the battery temperature and the battery deterioration degree.

10. A control device of a hybrid vehicle, the vehicle comprising an internal combustion engine as a power source for running the vehicle together with an electric motor, a high voltage battery which supplies electric current for driving the electric motor, and a low voltage battery which supplies electric current for a vehicle-mounted electrical load, the control device comprising:

means for detecting a vehicle running state, means for determining a deceleration state of the vehicle, means for causing the electric motor to function as a generator in the deceleration state, means for performing control to charge the high voltage battery and low voltage battery by the current generated by the electric motor, and means for limiting the current generated by the electric motor by a limiter, means for causing the electric motor to generate a limited current, and means for varying the limited current according to the running state.

* * * * *